United States Patent
de Palo et al.

(10) Patent No.: US 7,595,103 B2
(45) Date of Patent: Sep. 29, 2009

(54) PIPE SYSTEMS OF POLYPROPYLENE COMPOSITIONS

(75) Inventors: Roberto de Palo, Ferrara (IT); Anteo Pelliconi, Rovigo (IT); Päivi Helena Huovinen, Milan (IT)

(73) Assignee: Basell Poliolefine Italia S.p.A., Milan (IT)

( * ) Notice: Subject to any disclaimer, the term of this patent is extended or adjusted under 35 U.S.C. 154(b) by 803 days.

(21) Appl. No.: 10/493,801

(22) PCT Filed: Oct. 15, 2002

(86) PCT No.: PCT/EP02/11514

§ 371 (c)(1), (2), (4) Date: Apr. 27, 2004

(87) PCT Pub. No.: WO03/037981

PCT Pub. Date: May 8, 2003

(65) Prior Publication Data

US 2007/0265398 A1 Nov. 15, 2007

(30) Foreign Application Priority Data

Oct. 30, 2001 (EP) ................................. 01125848

(51) Int. Cl.
| | |
|---|---|
| C08F 210/06 | (2006.01) |
| C08L 23/14 | (2006.01) |
| B29C 47/00 | (2006.01) |
| F16L 9/12 | (2006.01) |

(52) U.S. Cl. .............. 428/36.9; 428/36.91; 428/36.92; 138/178; 525/240; 526/348; 526/348.6

(58) Field of Classification Search ............ 138/178; 428/36.9, 36.91, 36.92; 525/240; 526/348, 526/348.6

See application file for complete search history.

(56) References Cited

U.S. PATENT DOCUMENTS

| | | | |
|---|---|---|---|
| 4,399,054 A | 8/1983 | Ferraris et al. | 252/429 B |
| 5,145,819 A | 9/1992 | Winter et al. | 502/117 |
| 5,324,800 A | 6/1994 | Welborn, Jr. et al. | 526/160 |
| 6,300,420 B1 | 10/2001 | Jääskeläinen et al. | 525/240 |

FOREIGN PATENT DOCUMENTS

| | | |
|---|---|---|
| EP | 0045977 | 2/1982 |
| EP | 0129368 | 12/1984 |
| EP | 0361493 | 4/1990 |
| EP | 0395083 | 10/1990 |
| EP | 0416815 | 3/1991 |
| EP | 0420436 | 4/1991 |
| EP | 0444446 | 9/1991 |
| EP | 0485823 | 5/1992 |
| EP | 0573862 | 12/1993 |
| EP | 0643066 | 3/1995 |
| EP | 0671404 | 9/1995 |
| EP | 0674991 | 10/1995 |
| EP | 0728769 | 8/1996 |
| EP | 0782587 | 7/1997 |
| EP | 1260546 | 11/2002 |
| WO | 91/04257 | 4/1991 |
| WO | WO 96/11216 | * 4/1996 |
| WO | 97/33117 | 9/1997 |

* cited by examiner

*Primary Examiner*—Roberto Rábago
(74) *Attorney, Agent, or Firm*—Jarrod N. Raphael

(57) ABSTRACT

Polypropylene pipes (parts by weight): 1) 100 parts of a crystalline random copolymer of propylene with 1-15% by weight of a $C_4$-$C_{10}$ α-olefin or a crystalline random copolymer of propylene with 1-15% by weight of $C_4$-$C_{10}$ α-olefin and with 1-7% by weight of ethylene 2) 0 to 70 parts of an elastomeric polyolefin selected from the group consisting of: (a) a copolymer of ethylene with propylene and, optionally a diene, having an ethylene content of from 17 to 45 wt % and an propylene content from 55 to 83 wt %; (b) a copolymer of ethylene with a $C_3$-$C_{10}$ α-olefin having an ethylene/$C_3$-$C_{10}$ α-olefin weight ratio of from 29 to 86 wt % ($^{13}$C-NMR analysis) and having an $\overline{M}w/\overline{M}n$ ratio of less than 3.5; and 3) 0-30 parts of a polymer of ethylene having a melting temperature over 120° C. and intrinsic viscosity of from 2 to 6 dL/g; with the proviso that when the elastomeric polyolefin is present, the polymer of ethylene is at least 12 parts based on 100 parts of the crystalline random propylene copolymer (1) and that at least one of the layer made of the said polymer propylene composition is substantially free from random copolymers of propylene with 15 wt % or less of ethylene as the sole comonomer.

21 Claims, 5 Drawing Sheets

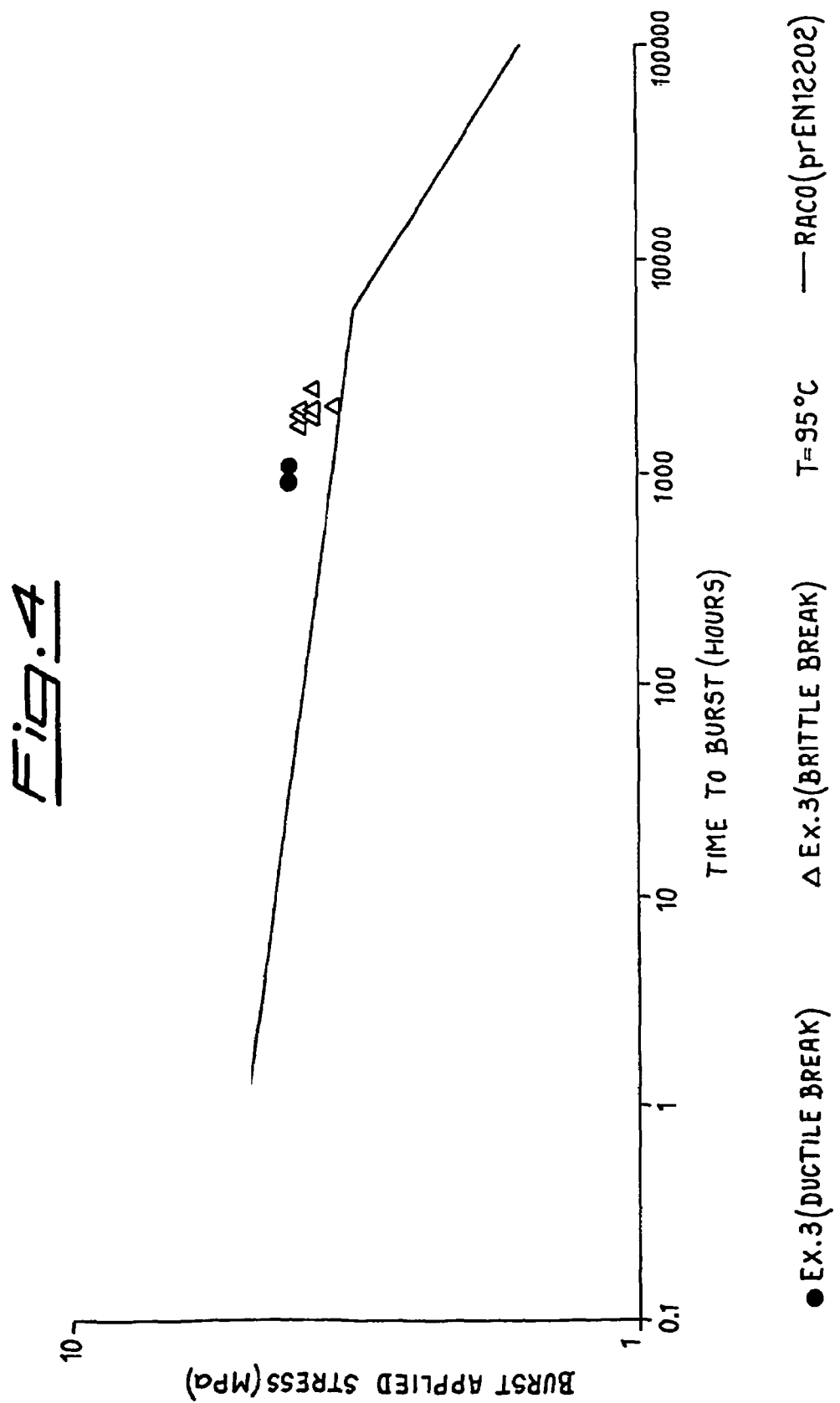

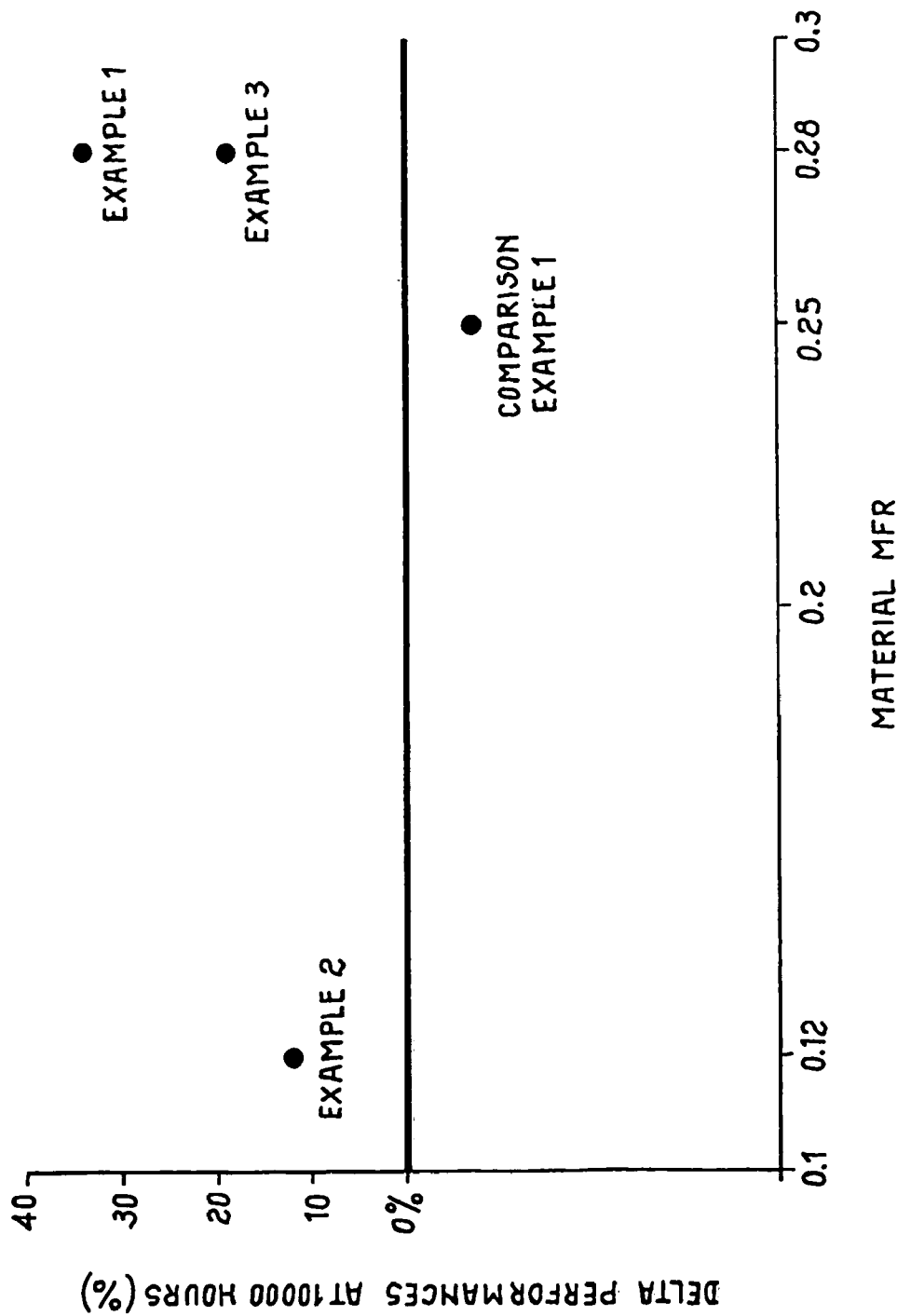

PIPE SYSTEMS OF POLYPROPYLENE COMPOSITIONS

Figure 1:
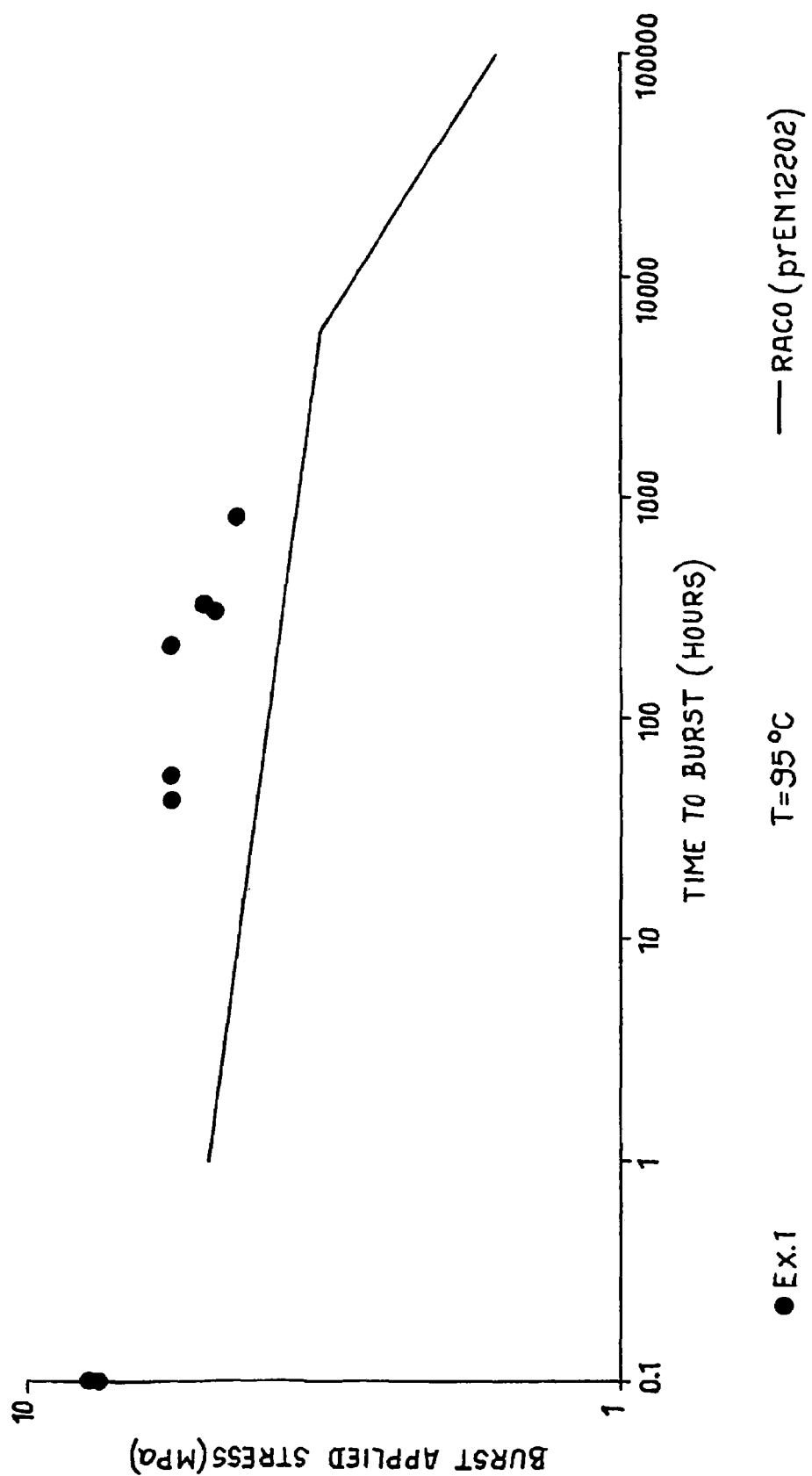

This application is the U.S. national phase of International Application PCT/EP02/11514, filed Oct. 15, 2002.

The present invention relates to pipe systems made of polypropylene compositions.

The good mechanical features, in particular the good resistance of the wall of the pipe to pressure exerted by the fluid inside the pipe on the wall of the pipe make the polypropylene material pipe systems of the present invention suitable to transport fluids, in particularly fluids under high pressure.

Nowadays, pipes of polymer material are frequently used for various purposes, such as fluid transport, i.e. transport of liquid or gas, e.g. water and natural gas, during which the fluid can be pressurised. The mostly used plastic materials for the said application are now polyvinyl chloride (PVC) and polyethylene (HDPE and MDPE). The latter is mostly accepted for the unique combination of good burst pressure resistance and impact properties at the installation temperatures.

In pressure pipes applications polypropylene is appreciated in hot water distribution systems inside buildings and/or when high chemical resistance is required.

Pipes wherein the polypropylene plastic material is used in the place of the above-mentioned plastic materials are not usually used till now, in particular due to lower creep resistance or insufficient impact strength of the propylene polymer.

It is known today how to produce pipes of the polypropylene plastic material endowed with improved creep resistance and impact strength.

For example, according to international patent application WO 97/33117, one can obtain pipes of the polypropylene plastic material having high creep resistance, high long-term-pressure resistance, improved stiffness and resistance to rapid crack propagation as well. According to the said document, the catastrophic failure of a pipe of polypropylene plastic is prevented when the pipe is made of several layers of different polypropylene plastic material, wherein at least one layer consists of a broad molecular weight distribution (MWD) polypropylene that provides the high creep resistance and at least one layer consists of an elastomer-modified polypropylene that improves the impact strength. The said broad MWD polypropylene is a mixture of a very high molecular weight propylene random copolymer with 1-10 Wt % of ethylene or a higher-α-olefin repeating units and of a low molecular weight propylene polymer with low (up to 1 wt %) or zero comonomer. The preferred comonomer is ethylene as it also appears from the examples, in which a propylene-ethylene copolymer only is used.

The applicant has now provided mono- or multilayer pipes with good mechanical properties, wherein at least one layer is made of the polypropylene material described hereinbelow.

In particular, the pipes of the present invention have improved burst pressure performances (creep resistance) but may also have a good balance of other mechanical features, in particular the pipes may be endowed with both high stiffness and impact resistance.

An important practical advantage of the pipes according to the present invention is that the polypropylene plastic material having the above properties can be made in one polymerisation step. Another advantage is that the pipes can be made of one layer only. The above advantages make the production of pipes easier and also more economic.

Therefore, the present invention provides polypropylene pipes having at least one layer made of a propylene polymer composition having a melt flow rate value of 2 g/10 min or less, the composition comprising (parts by weight):

1) 100 parts of a crystalline random copolymer of propylene with 2-15% by weight of a $C_4$-$C_{10}$ α-olefin or a crystalline random copolymer of propylene with 1-15% by weight of $C_4$-$C_{10}$ α-olefin and with 1-7% by weight of ethylene and being prepared by polymerising the monomers in a single polymerisation stage or in two or more sequential polymerisation stages or by blending the products of two or more separate polymerisation stages, the polymer product of each stage always containing not less than 2 wt % of comonomer(s) (namely ethylene and/or $C_4$-$C_{10}$ α-olefin);

2) 0 to 70 parts of an elastomeric polyolefin selected from the group consisting of:
   a) a copolymer of ethylene with propylene and, optionally a diene, having an ethylene content of from 17 to 45 wt % and a propylene content from 55 to 83 wt %; and
   b) a copolymer of ethylene with a $C_3$-$C_{10}$ α-olefin having an ethylene/$C_3$-$C_{10}$ α-olefin weight ratio of from 29 to 86 wt % ($^{13}$C-NMR analysis) and having a weight average molecular weight/number average molecular weight (Mw/Mn) ratio of less than 3.5; and 3) 0-30 parts of a polymer of ethylene having a melting temperature over 120° C. and intrinsic viscosity of from 2 to 6 dL/g;

with the proviso that when the elastomeric polyolefin 2) is present, the amount of polymer of ethylene 3) is at least 12 parts based on 100 parts of copolymer 1) and that at least one of the layer made of the said polymer propylene composition is substantially free from random copolymers of propylene with 15 wt % or less of ethylene as the sole comonomer.

The polymer composition has a melt flow rate (MFR) value preferably in the range of from 0.01 to 1 g/10 min, according to the method ASTM D 1238, condition L.

Preferably the said crystalline propylene random copolymer (1) has at least a broad enough molecular weight distribution. The value of the polydispersity index (PI) as a measure of the MWD is, therefore, 3 or more, preferably from 4 to 15.

The said crystalline copolymer has, preferably, a xylene-insoluble moiety at ambient temperature, i.e. at about 25° C., of at least 80% by weight, more preferably at least 85% by weight. The method for determining the xylene-insoluble moiety is disclosed hereinbelow.

When copolymer (1) is a propylene-butene-1 copolymer, it has preferably a butene-1 content of 5-10% by weight.

When copolymer (1) is a propylene-ethylene-butene-1 copolymer, it has preferably an ethylene content of 2-5% by weight and preferably a butene-1 content of 2.5-10% by weight.

Typically the said composition has burst pressure resistance at 20° C. higher than 6.3 MPa, preferably equal to or higher than 8 MPa according to method ISO TR 9080, year 1992.

Other typically properties of the composition of the present invention are the Izod impact resistance at −20° C. higher than 5 kJ/m², preferably higher than 6 kJ/m², tensile strength at yield higher than 20 MPa, elongation at yield higher than 20%, strength at yield higher than 12 MPa, elongation at break higher than 200% and flexural modulus higher than 700 MPa.

The said polyolefin composition may also be blended with other polymers. Suitable elastomeric polymers are in particular ethylene-propylene copolymers (a) containing from 17 to 45% in weight of ethylene (such as EP rubbers), where optionally a portion from 5 to 15% in moles of the propylene with respect to the total weight of the copolymer is substituted by $C_4$-$C_8$ higher α-olefins. Specific examples of said higher α-olefins are 1-butene, 1-pentene, 1-hexene, 4-methyl-1-pentene. Other examples are ethylene-propylene-diene terpolymers (EPDM rubbers) containing from 17 to 45% by weight of ethylene, and from 0.5 to 10% in moles of a diene, and where, as for the above mentioned EPR, a portion ranging from 5 to 15% in moles of the propylene can be substituted by $C_4$-$C_8$ α-olefins. Preferred examples of dienes for the EPDM rubber are 2-ethylidene-5-norbornene, dicyclopentadiene and 1,4-hexadiene. The said EPR and EPDM generally have a density of 0.88 g/mL or less. The density values cited herein are measured according to the ASTM-D 1505 method. The said EPR and EPDM typically have a medium or broad molecular-weight distribution expressed as $\overline{Mw}/\overline{Mn}$ ratio, the said ratio is typically higher than 4, preferably higher than 5. The molecular weight is determined by the gel permeation chromatography analysis.

Copolymer (2)(b) has the Mw/Mn ratio preferably less than 3. Preferred examples are the poly(ethylene-co-octene-1). Even more preferred are those having a weight content of 1-octene ranging from 20 to 45% (according to $^{13}$C-NMR analysis). Preferably copolymer (2)(b) has a density of less than 0.89 g/mL.

When present, the elastomeric polyolefin (2) is preferably in quantities typically ranging from 2 to 70 parts by weight with respect to 100 parts by weight of crystalline random propylene copolymer (1).

Suitable polymers of ethylene (3) are selected from an ethylene homopolymer (such as HDPE) and poly(ethylene-co-$C_3$-$C_{10}$α-olefin) having the above-mentioned intrinsic viscosity measured in tetrahydronaphthaline at 135° C. The said copolymer contains a minor amount of comonomeric recurring units, such as from 0.5 to 20% by weight. The preferred comonomers are propylene and 1-butene. The said polymers of ethylene typically have a value of density of 0.91 g/mL or higher.

Such polymers of ethylene (3) are obtainable, for example, by polymerisation of ethylene in the gas phase or in suspension polymerisation using customary Ziegler catalysts or Philips catalysts. The polymers of ethylene (3) can also be obtained with the aid of metallocene catalysts.

Moreover, various additives conventionally used for polyolefins and polymer processing can be added into the propylene polymer composition. Such additives include mineral oil, inorganic fillers, processing aids, wax, colorants, plasticizers, carbon black, antioxidants and stabilizers, such as UV stabilizers, hindered phenols and HALS. The antioxidants are selected from those having long-term performances.

The said propylene polymer compositions are produced with conventional processes in apparatus equipped with mixing elements, such as an internal mixers or extruders.

The crystalline propylene random copolymers (1) can be prepared by a polymerisation process carried out in one or more stage(s). In the latter case, the polymerization process is carried out in at least two consecutive steps, wherein different copolymers are prepared in separate subsequent steps, operating in each step, except the first step, in the presence of the polymer formed and the catalyst used in the preceding step. The catalyst is added only in the first step; however its activity is such that it is still active for all the subsequent steps. The order in which copolymers are prepared is not critical.

Methods of preparing such broad MWD propylene copolymers to be used in the present invention are described in European patent application 573 862, for example.

The polymerisation process can be carried out in continuous or in batch, according to known techniques and operating in liquid phase, in the presence or absence of inert diluent, or in gas phase or in mixed liquid-gas phases. It is preferable to operate in gas phase.

Reaction time and temperature are not critical; however, it is best if the temperature ranges from 20 to 100° C.

Regulation of the molecular weight is carried out by using known regulators such as hydrogen.

The process used for preparing the composition of the present invention according to the preferred process is illustrated in EP application 782 587.

In detail, the said process comprises feeding one or more monomers to said polymerisation zones in the presence of catalyst under reaction conditions and collecting the polymer product from the said polymerisation zones. In said process the growing polymer particles flow upward through one (first) of the said polymerisation zones (riser) under fast fluidisation conditions, leave said riser and enter another (second) polymerisation zone (downcomer) through which they flow downward in a densified form under the action of gravity, leave said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, and is preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 and 120° C.

The operating pressure can range between 0.5 and 10 MPa, preferably between 1.5 to 6 MPa.

Advantageously, one or more inert gases are maintained in the polymerisation zones, in such quantities that the sum of the partial pressures of the inert gases is preferably between 5 and 80% of the total pressure of the gases. The inert gas can be nitrogen or propane, for example.

Preferably, the various catalyst components are fed to the riser at any point of the said riser. However, they can also be fed at any point of the downcomer. The catalyst can be in any physical state, therefore catalysts in either solid or liquid state can be used.

When copolymer (1) is produced according to the above-preferred process and the composition also comprises polymers (2) and (3), copolymers (2) and (3) are typically produced with the conventional fluidised-bed gas-phase technologies.

The preferred catalysts to be used in the present polymerization process are Ziegler-Natta catalysts comprising a solid catalyst component including a titanium compound having at least one titanium-halogen bond, and an electron-donor compound, both supported on a magnesium halide in active form as preferred support, optionally with silica as co-support.

Catalysts having the above mentioned characteristics are well known in the patent literature; particularly advantageous are the solid catalyst components used in the catalysts described in U.S. Pat. No. 4,399,054, European patents 45977 and 395083.

The solid catalyst components used in the said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

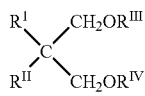

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said dieters are as follows: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl)fluorene.

The preparation of the above mentioned catalyst components is carried out according to various methods. For example, a $MgCl_2$.nROH adduct (in particular in the form of spherical particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Ziegler-Natta catalysts also comprise a co-catalyst, i.e. an organoaluminum compound, such as an aluminum alkyl compound. An external donor is optionally added to the organoaluminum compound.

The Al-alkyl compounds used as co-catalysts comprise the Al-trialkyls, such as Al-triethyl, Al-triisobutyl, Al-tributyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates and in particular silicon compounds containing at least one Si—OR bond, where R is a hydrocarbon radical. Useful examples of silicon compounds are (tert-butyl)$_2$Si(OCH$_3$)$_2$, (cyclopentyl)$_2$Si(OCH$_3$)$_2$, (cyclohexyl) (methyl)Si(OCH$_3$)$_2$ and (phenyl)$_2$Si(OCH$_3$)$_2$.

1,3-diethers having the formulae described above can also be used advantageously.

If the internal donor is one of these dieters, the external donors can be omitted.

Prior to the polymerisation process, the catalysts can be precontacted with small quantities of olefins (prepolymerisation), thus improving both the performance of the catalysts and the morphology of the polymers. Prepolymerisation is carried out maintaining the catalysts in suspension in a hydrocarbon solvent (hexane or heptane, for example) and polymerising at a temperature from ambient to 60° C. for a time sufficient to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts is the so-called constrained geometry catalysts, as described in EP-A-0 416 815, EP-A-0 420 436, EP-A-0 671 404, EP-A-0 643 066 and WO 91/04257.

The pipes according to the present invention are produced in manner known per se by extrusion or injection moulding, for instance. The multilayer pipes are produced by coextrusion or other methods as well.

When the pipes are multilayer, at least one layer is made of the propylene polymer composition described above. The further layer(s) is/are preferably made of an amorphous or crystalline polymer (homopolymer and copolymer) of R—CH═CH$_2$ olefins, where R is a hydrogen atom or a $C_1$-$C_6$ alkyl radical. Particularly preferred are the following polymers:

1) isotactic or mainly isotactic propylene homopolymers;
2) random copolymers of propylene with ethylene and/or $C_4$-$C_8$ α-olefin, such as 1-butene, 1-hexene, 1-octene, 4-methyl-1-pentene, wherein the total comonomer content ranges from 0.05% to 20% by weight, or mixture of said copolymers with isotactic or mainly isotactic propylene homopolymers;

3) heterophasic copolymers comprising (a) a propylene homopolymer and/or one of the copolymers of item (2), and an elastomeric moiety (b) comprising copolymers of ethylene with propylene and or a $C_4$-$C_8$ α-olefin, optionally containing minor amounts of a diene, the same disclosed for polymer (2)(a);
4) amorphous polymers such as fluorinated polymers, polyvinyl difluoride (PVDF) for example.

In multilayer pipe the layers of the pipe can have the same or different thickness.

The following examples are given to illustrate but not limit the present invention.

The methods used to obtain the property data reported in the description and examples are identified below Determination of the comonomer content: by infrared spectroscopy (IR spectroscopy).

Solubility in xylene: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.)

Melt Flow Rate (MFR "L"): Determined according to ASTM D1238, condition L.

Polydispersity Index (PI): Calculated by way of a dynamic test carried out with a RMS-800 rheometric mechanical spectrometer. The PI is defined by the equation $PI=10^5/Gc$, where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200° C. after 90 minutes. At this temperature one carries out the test where G' and G" are measured in function of the frequency.

Flexural modulus: Determined according to the ISO 178 method.

Tensile stress at break and at yield: Determined according to the ISO 527 method.

Elongation at break and at yield: Determined according to the ISO 527 method.

Izod impact resistance: Determined according to the ISO 180/1A method.

Melting temperature: Determined by differential scanning calorimetry (DSC) according to the ASTM D 3417 method (which is equivalent to the ISO 11357/1 and 3 method).

Burst (hoop) pressure resistance: Determined according to the EN 921/ISO 1167 method. In the method, a constant stress is applied to a specimen (a pipe) having a defined length. A selected temperature is maintained constant throughout the test. The burst pressure resistance is defined as the time elapsed up to burst of the specimen.

EXAMPLE 1

A propylene copolymer is prepared by polymerising propylene and butene-1 in the presence of a highly stereospecific Ziegler-Natta catalyst. The catalyst comprises a solid catalyst component containing about 2.5% by weight of titanium supported on $MgCl_2$ and the diisobutyl phthalate as inside-electron donor compound, the content of which is around 8.5% by weight. The solid catalyst component is prepared by analogy with the method described in the examples of European patent application 674991.

Before introducing the catalyst system into the polymerisation reactor, the above solid catalyst component is contacted at 20° C. for 9 minutes with triethyl aluminium (TEA) and dicycolopentyldimethoxysilane (DCPMS) as an outside donor in liquid propane.

The above catalyst system is then transferred into a reactor containing an excess of liquid propylene and propane to carry out prepolymerisation at 25° C. for 30 minutes before introducing it into a polymerisation reactor.

Into the polymerisation reactor a propylene copolymer is produced by feeding in a continuous and constant flow the prepolymerised catalyst system, hydrogen (used as molecular weight regulator) and propylene, comonomers and propane in the gas state.

The polymer particles exiting by the reactor are subjected to a steam treatment to remove the reactive monomers and volatile substances and then dried.

The polymerization temperature is 70° C.

EXAMPLE 2

A propylene copolymer is prepared by polymerising propylene, ethylene and butene-1 under continuous conditions in a plant comprising a gas-phase polymerisation apparatus.

The solid catalyst component used is similar to that used in example 1, except that it has a higher content of diisobutyl phthalate. The internal electron-donor content is around 13 to 15% by weight.

The catalyst system prepolymerised as described in example 1 is sent to the gas-phase polymerisation apparatus. The latter comprised two interconnected cylindrical reactors (riser and downcomer) pressurised at 24 bar. Fast fluidisation conditions are established in riser by recycling gas from the gas-solid separator. The polymerisation temperature is 70° C. in the riser. In the downcomer there is a gradient of polymerisation temperature from 70 to 83° C.

Table 1 shows the analysis of the copolymers produced in examples 1 and 2.

TABLE 1

| | Example | |
|---|---|---|
| | 1 | 2 |
| TEA/solid cat. component g/g | 10 | 6 |
| TEA/DCPMS g/g | 2.6 | 4 |
| $C_2^-/(C_2^- + C_3^-)$ mol/mol | — | 0.041 |
| $C_2^-/(C_2^- + C_3^-)$ mol/mol | — | 0.061 |
| $H_2/C_3^-$ mol/mol | — | 0.005 |
| Ethylene wt % | 0 | 3.4 |
| Butene-1 wt % | 6.5 | 3.9 |
| MFR"L" g/10 min | 0.26 | 0.12 |
| Xylene insoluble wt % | 97.2 | 90.5 |

FIG. 1 shows the burst stress performance measured at 95° C. of the polymer of example 1 in comparison with those of the reference standard diagram of random propylene-ethylene copolymer as indicated in prEN12202 (which is a type 3 polypropylene according to the classification of Comité européen de normalisation, CEN) that shows lower burst stress performances than the invented copolymer. The gentle slope of the master curve of the standard copolymer represents failure in a ductile mode, as the steep slope represents failure in a brittle mode. The failure of the copolymer of example 1 is in a ductile mode.

Figure 2:
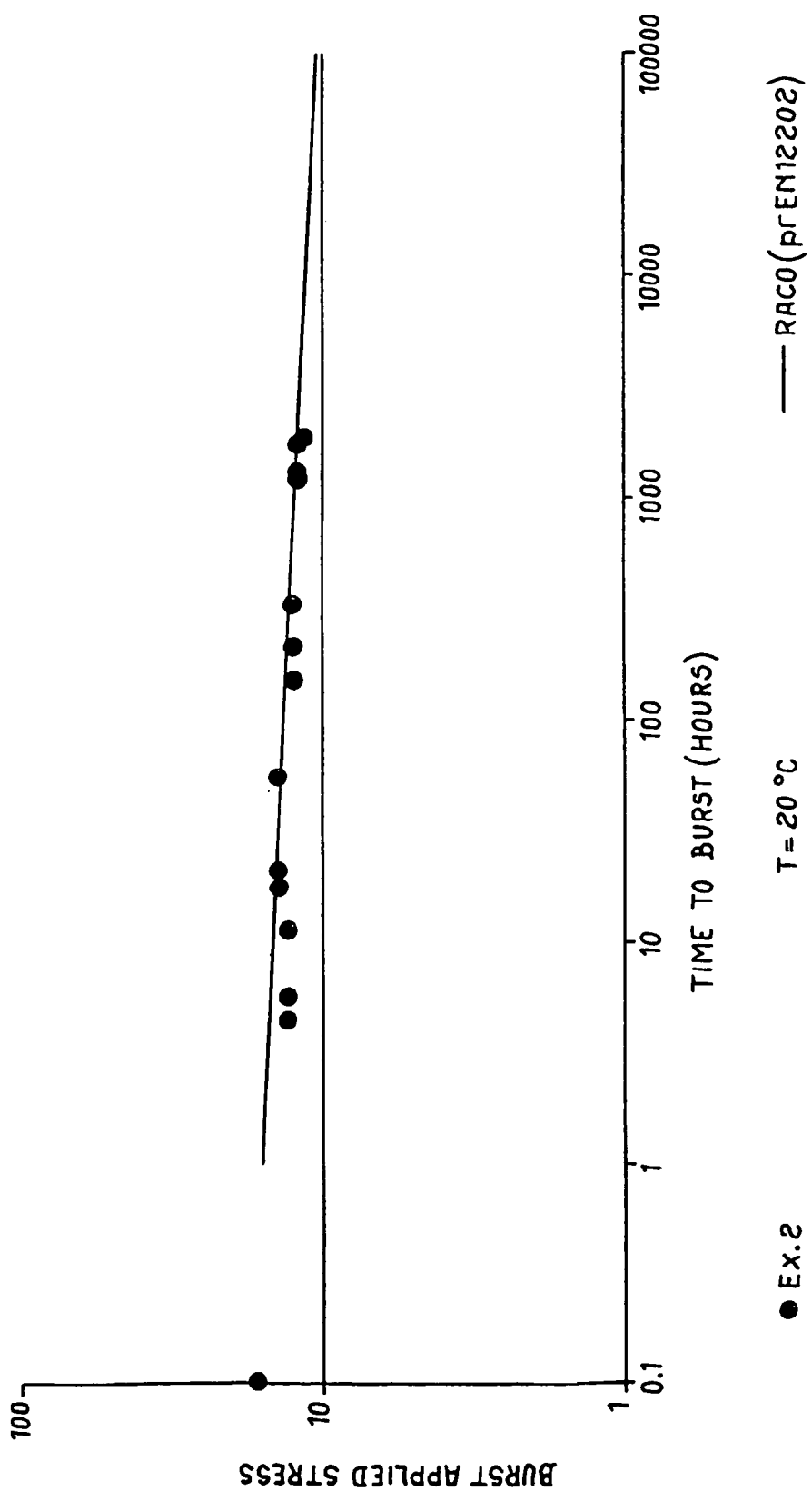

FIG. 2 shows the burst stress performances measured at 20° C. of the polymer of example 2 in comparison with those of the standard random propylene-ethylene copolymer as indicated in CEN norm prEN12202. In the standard copolymer reference curves the brittle mode of failure does not occur at 20° C. before at least 50 years, so only the ductile mode has been considered for this evaluation method to extrapolate the stress value on long term. The burst stress resistance of the standard copolymer at 20° C./50 years is 9.8 MPa The failure of the copolymer of example 2 is in a ductile mode.

Figure 3:
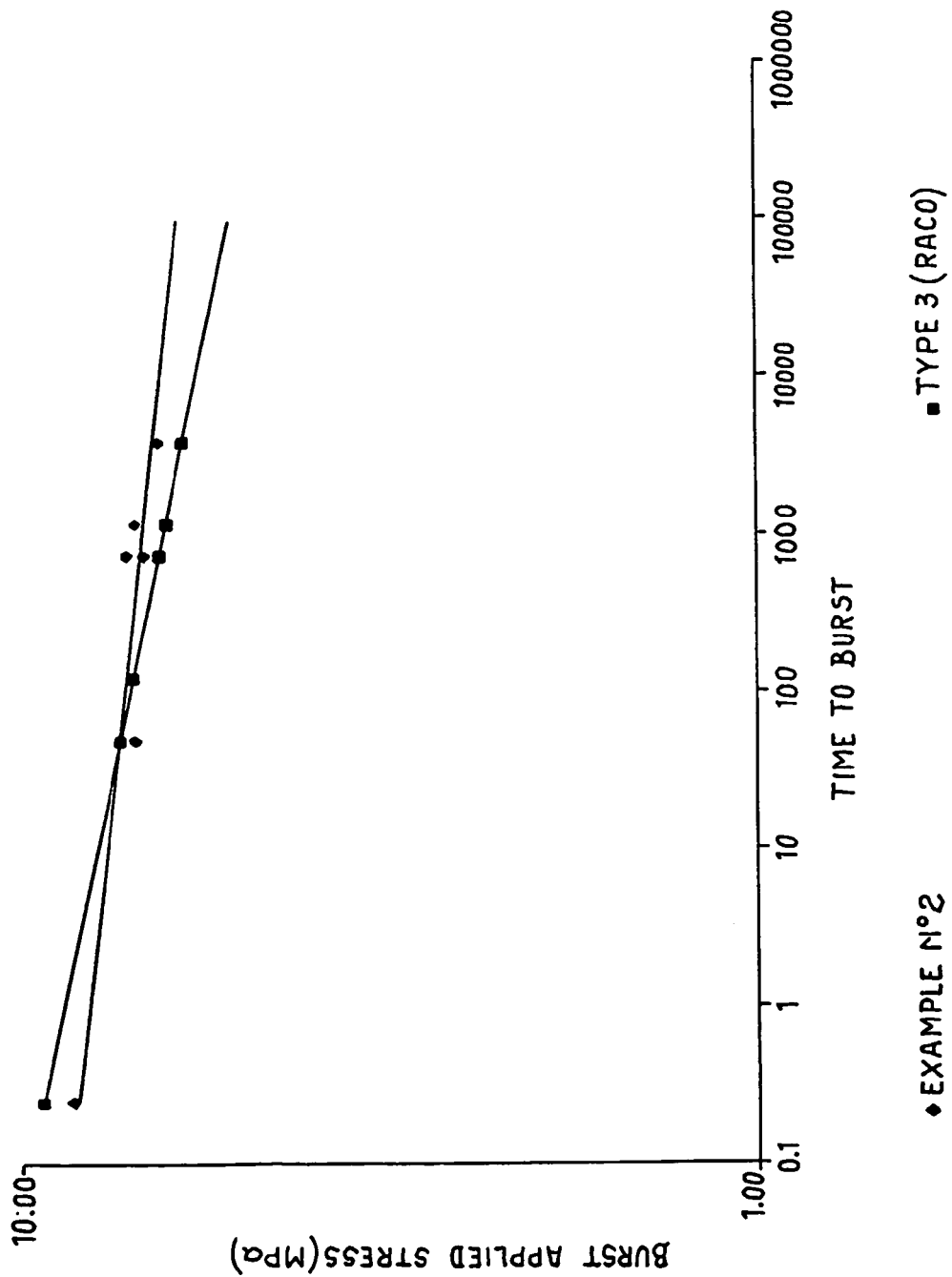

FIG. 3 shows the burst stress performances measured at 60° C. of the copolymer of example 2 in comparison with those of the said type 3 polypropylene. The burst stress performances of the copolymer of the present invention are better on long term.

EXAMPLE 3

Example 1 is repeated excepted that a two-step polymerisation process is carried out and the TEA/solid catalyst component weight ratio is 10.7.

The copolymer produced in the first reactor is discharged and, after having been purged of unreacted monomers, is introduced in a continuous flow into the second gas phase reactor together with quantitatively constant flow of hydrogen, propene, 1-butene and propane in the gas state.

COMPARATIVE EXAMPLE 1

Example 3 is repeated with the difference that a third polymerisation step is added in which a poly(propylene-co-ethylene) is produced. Moreover, the TEA/DCPMS weight ratio is 3 and the TEA/solid catalyst component weight ratio is 12.

The polymer composition thus produced does not have the same burst pressure resistance as the polymer compositions according to the present invention (FIG. 5).

Table 2 shows the analysis of the copolymer compositions produced in example 3 and comparative example 1c.

TABLE 2

| | Example and comparative example | |
|---|---|---|
| | 3 | 1c |
| First polymerisation reactor - Polymer analysis | | |
| Temperature ° C. | 67 | 70 |
| Butene-1 wt % | 6.8 | 6.1 |
| Copolymer[1) wt % | 70 | 61 |
| MFR"P"[2) g/10 min | 0.23 | 0.30 |
| Xylene insoluble wt % | 96.5 | 97.9 |
| Second polymerisation reactor - Polymer analysis | | |
| Temperature ° C. | 70 | 70 |
| Butene-1 wt % | 8.0 | 7.0 |
| Copolymer[1) wt % | 30 | 24 |
| MFR"L" g/10 min | 0.39 | 0.5 |
| Xylene insoluble wt % | 97.2 | 98.5 |
| Third polymerisation step | | |
| Temperature ° C. | 0 | 70 |
| Ethylene-1 wt % | 0 | 9.6 |
| Copolymer[1) wt % | 0 | 14 |
| Xylene insoluble wt % | 0 | 85 |
| Intrinsic viscosity of the xylene soluble dL/g | 0 | 2.9 |

[1)Amount calculated on the whole polymer composition
[2)MFR"P" conditions: 5 kg, 230° C.

Table 3 shows the properties of the polymer compositions produced in examples 1-3 and comparative example 1. The mechanical properties are measured after 7 days from the production of the specimens.

TABLE 3

| Properties of the polymer composition | 1 | 2 | 3 | 1c |
|---|---|---|---|---|
| MFR"L" g/10 min | 0.28 | 0.12 | 0.28 | 0.25 |
| PI | about 4 | 3.38 | 5.81 | 4.40 |
| Melting temperature ° C. | 147.6 | 131.7 | 146.4 | — |
| Flexural Modulus MPa | 1200 | 735 | 910 | 875 |
| Izod impact resistance at 23° C. kJ/m$^2$ | 38.5 | — | 47.1 | not broken |
| Izod impact resistance at −20° C. kJ/m$^2$ | 3.4 | 6 | 4.2 | 5.6 |
| Tensile stress at break MPa | 30.3 | 13.2 | 32 | 12.9 |
| Elongation at break % | 480 | 370 | 530 | 460 |
| Tensile stress at yield MPa | 32.2 | 23.5 | 33 | 25.2 |
| Elongation at yield % | 9.6 | 34.1 | 9.3 | 12.9 |

FIG. 4 shows the burst stress performances measured at 95° C. of the copolymer composition of example 3 in comparison with those of the reference standard random propylene-ethylene copolymer as indicated in prEN12202. The performances of the former are better than those of the latter. The failure of the copolymer composition of example 3 is in both a ductile and brittle mode.

FIG. 5 shows the calculated difference in percentage between the extrapolated burst pressure resistance of the copolymers of examples 1-3 and of comparative example 1 in comparison with the official ones of a type 3 polypropylene (the flat line). The values at the fixed time of 10,000 hours are extrapolated from the burst pressure resistance curves at 95° C., except for that of example 2 that is at 60° C.

The invention claimed is:

1. Polypropylene pipes having at least one layer made of a propylene polymer composition having a melt flow rate value of at most 2 g/10 min, the composition comprising (parts by weight):
   (1) 100 parts of a crystalline random propylene-ethylene-butene-1 copolymer having an ethylene content of 2-5% by weight and a butene-1 content of 2.5-10% by weight prepared by polymerising the monomers in a single polymerisation stage or in two or more sequential polymerisation stages or by blending polymer products of two or more separate polymerisation stages;
   (2) 0 to 70 parts of an elastomeric polyolefin selected from the group consisting of:
      (a) a copolymer of ethylene with propylene and, optionally a diene, having an ethylene content of from 17 to 45 wt % and an propylene content from 55 to 83 wt %; and
      (b) a copolymer of ethylene with a $C_3$-$C_{10}$ α-olefin having an ethylene/$C_3$-$C_{10}$ α-olefin weight ratio of from 29 to 86 wt % ($^{13}$C-NMR analysis) and having a Mw/Mn ratio of less than 3.5; and
   (3) 0-30 parts of a polymer of ethylene having a melting temperature over 120° C. and intrinsic viscosity of from 2 to 6 dL/g;
with the proviso that when the elastomeric polyolefin is present, the polymer of ethylene is at least 12 parts based on 100 parts off the crystalline random propylene copolymer (1) and that at least one of the layer of the polypropylene pipes, made of the propylene polymer composition, is substantially free from random copolymers of propylene with at most 15 wt % of ethylene as the sole comonomer.

2. A process for preparing the polypropylene pipes according to claim 1 by extrusion or injection moulding.

3. The polypropylene pipes according to claim 1, wherein the crystalline random propylene-ethylene-butene-1 copolymer comprises a polydispersity index of at least 3.

4. The polypropylene pipes according to claim 1, wherein the crystalline random propylene-ethylene-butene-1 copolymer comprises a polydispersity index ranging from 4 to 15.

5. The polypropylene pipes according to claim 1, wherein the crystalline random propylene-ethylene-butene-1 copolymer comprises a xylene-insoluble moiety of at least 80% by weight at about 25° C.

6. The polypropylene pipes according to claim 1, wherein the crystalline random propylene-ethylene-butene-1 copolymer comprises a xylene-insoluble moiety of at least 85% by weight at about 25° C.

7. The polypropylene pipes according to claim 1, wherein the propylene polymer composition comprises a burst pressure resistance higher than 6.3 MPa at 20° C.

8. The polypropylene pipes according to claim 1, wherein the propylene polymer composition comprises a burst pressure resistance higher than 8 MPa at 20° C.

9. The polypropylene pipes according to claim 1, wherein the propylene polymer composition comprises an Izod impact resistance higher than 5 kJ/m$^2$ at −20° C.

10. The polypropylene pipes according to claim 1, wherein the propylene polymer composition comprises an Izod impact resistance higher than 6 kJ/m$^2$ at −20° C.

11. The polypropylene pipes according to claim 1, wherein the propylene polymer composition comprises an elongation at yield higher than 20%.

12. The polypropylene pipes according to claim 1, wherein the propylene polymer composition comprises an elongation at break higher than 200%.

13. The polypropylene pipes according to claim 1, wherein the propylene polymer composition comprises a flexural modulus higher than 700 MPa.

14. The polypropylene pipes according to claim 1, wherein the elastomeric polyolefin component (2)(b) comprises a Mw/Mn ratio less than 3.

15. The polypropylene pipes according to claim 1, wherein the elastomeric polyolefin component (2)(b) comprises poly(ethylene-co-octene-1).

16. The polypropylene pipes according to claim 1, wherein the elastomeric polyolefin component (2)(b) comprises 1-octene ranging from 20% to 45% by weight.

17. The polypropylene pipes according to claim 1, wherein the elastomeric polyolefin component (2)(b) comprises a density of less than 0.89 g/mL.

18. The polypropylene pipes according to claim 1, wherein the polymer of ethylene component (3) is selected from HDPE and poly(ethylene-co-$C_3$-$C_{10}$-α-olefin).

19. The polypropylene pipes according to claim 1, wherein the polymer of ethylene component (3) comprises 0.5% to 20% by weight of recurring comonomeric units.

20. The polypropylene pipes according to claim 1, wherein the polymer of ethylene component (3) comprises a density of at least 0.91 g/mL.

21. The polypropylene pipes according to claim 1, wherein the polymer of ethylene component (3) is an ethylene homopolymer.

* * * * *